United States Patent [19]
Saito et al.

[11] Patent Number: 5,829,955
[45] Date of Patent: Nov. 3, 1998

[54] STEAM TURBINE

[75] Inventors: Eiji Saito, Hitachi; Kiyoshi Namura; Masakazu Takasumi, both of Ibaraki; Kazuo Ikeuchi; Masumi Katayose, both of Hitachi, all of Japan

[73] Assignee: Hitachi, Ltd., Tokyo, Japan

[21] Appl. No.: 790,796

[22] Filed: Jan. 30, 1997

[30] Foreign Application Priority Data

Jan. 31, 1996 [JP] Japan .................................. 8-014992

[51] Int. Cl.$^6$ .................................................. F04D 29/38
[52] U.S. Cl. ........................................................ 416/191
[58] Field of Search ............................................ 416/191

[56] References Cited

U.S. PATENT DOCUMENTS

| | | | |
|---|---|---|---|
| 4,155,152 | 5/1979 | Cretella et al. | 416/191 |
| 4,798,519 | 1/1989 | Zipps et al. | 416/191 |
| 4,840,539 | 6/1989 | Bourcier et al | 416/191 |
| 5,261,785 | 11/1993 | Williams | 416/191 |
| 5,460,486 | 10/1995 | Evans et al. | 416/191 |

FOREIGN PATENT DOCUMENTS

| | | |
|---|---|---|
| 3-26801 | 2/1991 | Japan . |
| 4-5402 | 1/1992 | Japan . |

*Primary Examiner*—John T. Kwon
*Attorney, Agent, or Firm*—Fay, Sharpe, Beall, Fagan, Minnich & McKee

[57] ABSTRACT

A steam turbine is provided with moving blades which are affected less by erosion and fretting wear due to water and have a high reliability in strength. The moving blades are twisted moving blades, each provided with a blade portion and a shroud portion formed at its tip and a contact surface between shroud portions connecting adjacent moving blades whereby an extension plane of the contact surface toward the blade back side does not intersect with the blade tip of the blade back side shroud portion.

8 Claims, 9 Drawing Sheets

STEAM TURBINE

BACKGROUND OF THE INVENTION

The present invention relates to a steam turbine having twisted moving blades and, more particularly, to a steam turbine provided with twisted moving blades each having a shroud at its blade tip.

In general, turbine moving blades, each of which is a twisted moving blade the sectional profile of which is twisted from a blade root to a blade tip, are always excited in a wide frequency range by the flow of working fluid and its disturbance component. Vibration response of a blade structure to those exciting force relates to a natural frequency and a magnitude of attenuation. In order to design a blade structure, which is separated from a lower mode of vibration which is large in resonance response, and which is reliable in a higher mode of vibration which is small in resonance response even if resonance takes place, connecting means such as a shroud for connecting adjacent moving blades is adopted in many cases. By connecting the adjacent moving blades, it can be expected to increase stiffness in the blade structure and attain an additional effect of vibration attenuation.

For example, JP A 3-26801 and JP A 4-5402 disclose that a shape, viewed from an outer peripheral direction, of a moving blade cover provided as a shroud at a blade tip of a twisted moving blade is shaped in a S-letter or an inverse Z-letter, and the blade covers of twisted moving blades adjacent to each other are in contact with each other at a center of the S-letter or the inverse Z-letter. In the blade structure, the shrouds of the adjacent twisted moving blades restrain untwisting of the twisted moving blades by the contact surface therebetween, whereby connection action between the adjacent twisted moving blades is raised (a moving blade having a structure in which a blade portion of a twisted moving blade and a shroud portion are integrally formed is referred to as an integral shroud blade, hereunder).

Since such forces act on each other at the contact surface in opposite directions so as to restrain the untwisting acting on the adjacent shrouds during turbine rotation, if there is a notch-like concave portion in the shroud at a blade back side, stresses caused by the force restraining the untwisting of the twisted moving blades are concentrated on the concave portion. Therefore, it is necessary to pay attention to the strength of the integral shroud blade.

Further, in a case where the integral shroud blades are applied to a steam turbine, erosion due to water droplets in steam and fretting wear at a contact surface exposed to a wet steam atmosphere takes place as an inherent problem in the steam turbine, a position at which the most high stress concentration occurs may be become brittle.

However, the above-mentioned prior art does not take this problem into consideration.

In a steam turbine driven in a steam atmosphere, it is important to lessen the above-mentioned erosion and fretting wear.

SUMMARY OF THE INVENTION

A first object of the present invention is to provide a high reliability steam turbine provided with moving blades in which stress concentration is lessened and erosion is suppressed.

A second object of the present invention is to provide a high reliability steam turbine provided with moving blades in which stress concentration is lessened, erosion is suppressed and an influence of fretting wear due to water is lessened.

Moving blades used for a steam turbine according to the present invention are, based on the idea that a degree of stress concentration on a blade back side can be lessened by arranging a contact surface between shrouds connecting adjacent moving blades so that the contact surface or an extension plane of the contact surface toward the blade back side does not intersect with the blade back side at which the shroud is joined, and a high reliability integral shroud blade can be constructed by separating a place at which erosion is apt to occur from a place at which stress is concentrated.

Moving blades used for a steam turbine according to the present invention are, based on the idea that a degree of stress concentration on a blade back side can be lessened by arranging a contact surface between shrouds connecting adjacent moving blades so that the contact surface or an extension plane of the contact surface toward the blade back side does not intersect with the blade back side at which the shroud is joined, and a high reliability integral shroud blade can be constructed by separating a place at which erosion is apt to occur from a place at which stress is concentrated. This invention is base on the idea that since a degree of exposure to a water film flow due to water drop can be lessened by arranging the contact surface of the blade back side shroud portion in a upstream side of the blade leading edge, affection of fretting wear of the contact surface between the adjacent shrouds can be lessened.

To attain the first object of the present invention, in a first aspect of the present invention, each of the moving blades is a twisted moving blade formed so that the sectional profile of the moving blade is twisted from a blade root thereof to a blade tip thereof, and provided with a shroud formed integrally with and at the blade tip of the moving blade, wherein a plane including a contact surface between a blade back side shroud portion of one of the moving blades and a blade face side shroud portion of another moving blade adjacent to the one moving blade intersects with a forward extension line of a camber line in the blade tip of the one moving blade, and the contact surface is arranged so that an angle between the plane and a steam upstream side end of the blade back side shroud portion is an obtuse angle.

In order to attain the second object of the present invention, in a second aspect of the present invention, each of the moving blades is a twisted blade formed so that the sectional profile of the moving blade is twisted from a blade root thereof to a blade tip thereof, and provided with a shroud formed integrally with and at the blade tip of the moving blade, wherein a contact surface between a blade back side shroud portion of one of the moving blades and a blade face side shroud portion of another moving blade adjacent to the above-mentioned one moving blade is positioned in a region at a more upstream side of steam flow than a leading edge at the blade tip of the above-mentioned one moving blade.

In order to attain the second object of the present invention, in a third aspect of the present invention, each of the moving blades is a twisted blade formed so that the sectional profile of the moving blade is twisted from a blade root thereof to a blade tip thereof, and provided with a shroud formed integrally with and at the blade tip of the moving blade, wherein a contact surface, viewed from an outer peripheral side, between a blade back side shroud portion of one of the moving blades and a blade face side shroud portion of another moving blade adjacent to the above-mentioned one moving blade is positioned at a more forward side in a rotational direction of the moving blades than a shortest straight line connecting a leading edge at the blade tip of the above-mentioned one moving blade and the blade face of the above-mentioned another moving blade.

DESCRIPTION OF EMBODIMENTS OF THE INVENTION

Figure 1:
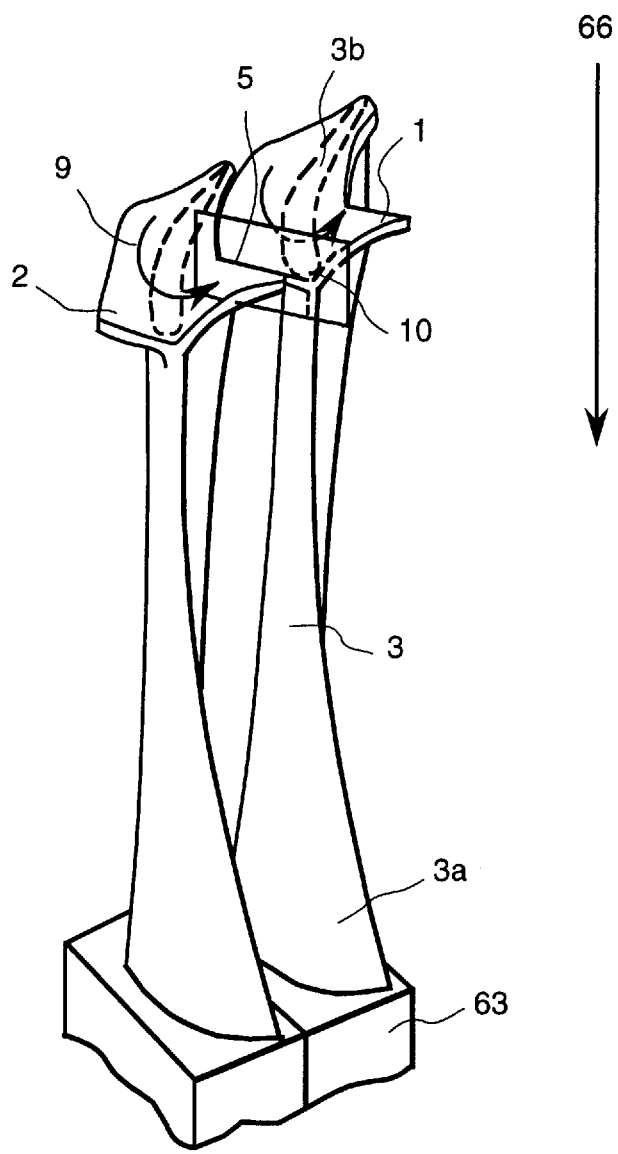
FIG. 1 is a perspective view of steam turbine moving blades of an embodiment of the present invention.
Figure 2:
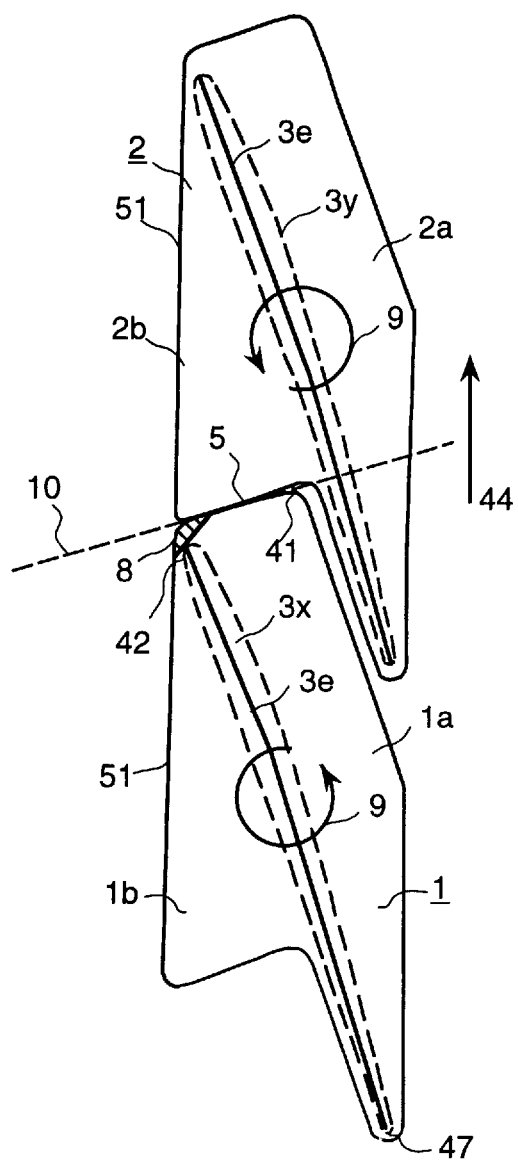
FIG. 2 is a plan view of shrouds of the steam turbine moving blades of the embodiment of FIG. 1 of the present invention.
Figure 3:
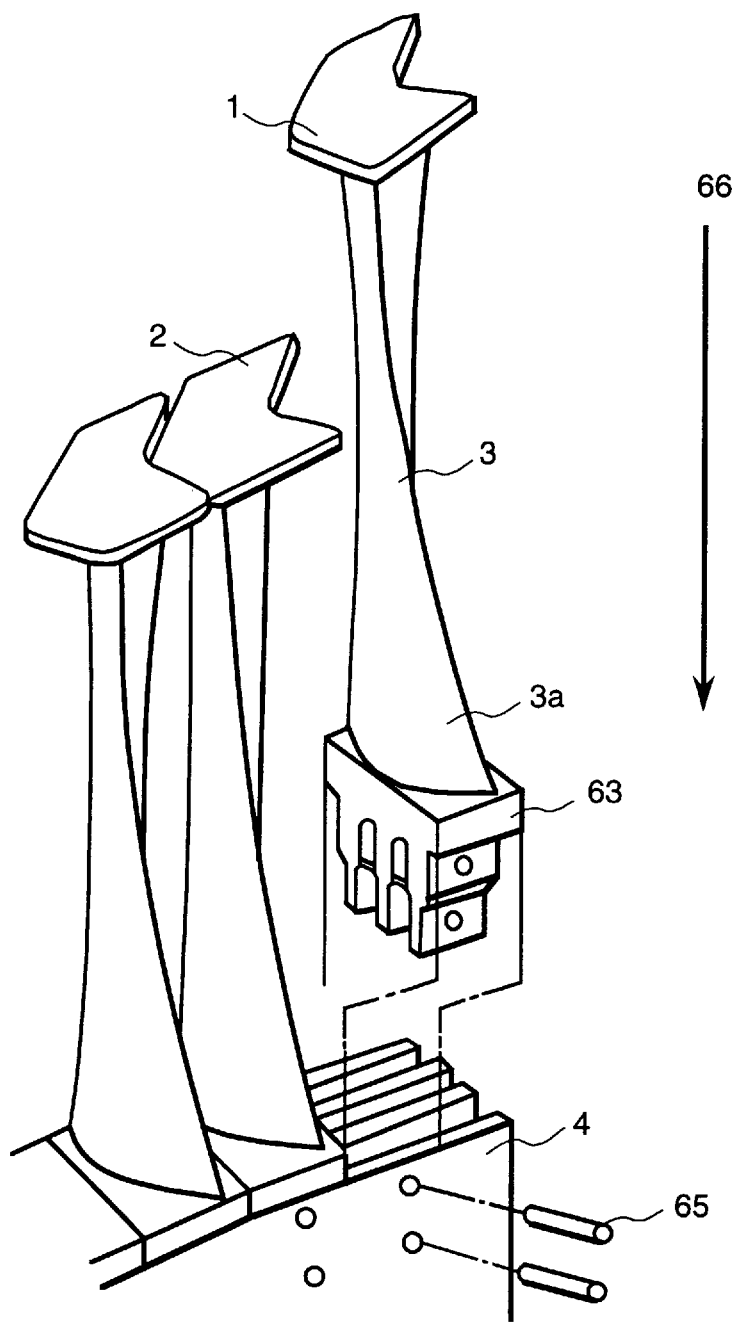
FIG. 3 is a perspective view of the steam turbine moving blades according to the embodiment of FIG. 1 of the present invention, showing assembling of the moving blades.

An embodiment of the present invention is explained in detail hereunder, referring to FIGS. 1 to 3.

FIG. 1 shows steam turbine moving blades (a steam turbine moving blade is referred to as a moving blade hereunder), FIG. 2 is a plan view, viewed from an outer peripheral side of the moving blades, of shrouds, and FIG. 3 shows an example of an assembling method of the moving blades.

In FIGS. 1 and 2, a reference number 1 denotes a shroud of a following moving blade, a reference number 2 denotes a shroud of a preceding moving blade, reference numbers 1a and 2a each denote a blade back side shroud portion, reference numbers 1b and 2b each denote a blade face side shroud portion, a reference number 3x denotes a blade section at a blade tip of the following moving blade, a reference number 3y denotes a blade section at a blade tip of the preceding moving blade, a reference number 63 denotes a blade root portion. A reference number 5 denotes a contact surface between the blade back side shroud portion 1a of the following moving blade and the blade face side shroud portion 2b of the preceding moving blade, a reference number 8 denotes a portion of the shroud 1b in the vicinity of a blade leading edge (of blade section) at the tip of the following moving blade, a reference number 10 denotes a plane including the above-mentioned contact surface 5, a reference number 51 denotes an upstream side end of each of the shrouds 1, 2. In FIG. 3, a reference number 3 denotes a blade portion, a reference number 4 denotes a turbine rotor disc portion and a reference number 65 denotes a pin.

In FIG. 2, the contact surface 5 between the shrouds 1, 2 is an abutment of the blade back side shroud portion 1a (or 2a) of one moving blade and the blade face side shroud portion 2b (or 1b) of another moving blade adjacent to the above-mentioned one moving blade having the shroud 1a (or 2a), a plane 10 including the contact surface 5 is arranged at a position at which the plane 10 does not intersect with (a cross section of) the tip portion of the blade portion 3.

Figure 12:
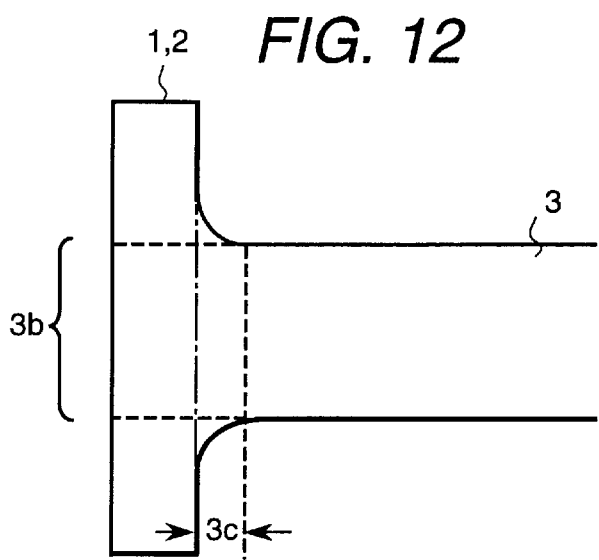
FIG. 12 is a view for explaining a shroud of a moving blade.

Here, the above-mentioned shroud portion is explained concretely, referring to FIG. 12.

A reference number 3 denotes a blade portion and 1 and 2 denote a shroud, which is viewed from an advancing direction of the moving blades, for example.

A portion where a blade tip is projected on an outer surface of the shroud 1, 2 (by extending the blade portion 3 to the shroud side) is called a blade tip portion 3b. In a case where round portions 3c are formed between the shroud portion 1, 2 and the blade portion 3, a portion that the tip except for the round portions 3c is projected on the outer surface of the shroud 1, 2 is called a tip portion 3b.

In FIG. 2, a section of the blade portion 3 at the blade tip portions 3b is denoted by 3x, 3y. A leading edge, trailing edge, blade camber line of the shroud 1, 2 correspond to the leading edge, trailing edge, blade camber line on a blade profile denoted by 3x, 3y on the blade tip portion.

Further, in FIGS. 1 and 2, in the shrouds 1, 2 provided at the blade tips, when blade camber lines 3e on the blade sections 3x, 3y are extended to the leading and trailing edge sides, portions of the shrouds 1, 2 which are disposed in regions at the blade back side are blade back side shroud portions 1a, 2a and the other portions of the shrouds 1, 2, disposed in regions at the blade face side are blade face side shroud portions 1b, 2b.

The moving blades are planted in grooves formed in the outer peripheral portion 4 of the rotor disc, fixed by pins 65 and contact circumferentially adjacent moving blades at the shrouds 1, 2 provided at the moving blade tip portions 3b. Since the moving blades each are a twisted moving blade formed so that the sectional profile is twisted from a blade root 3a thereof to the blade tip 3b, centrifugal force applied during rotation of the turbine untwists the moving blades, as shown by a reference number 9.

Next, the embodiment is explained further, referring to FIG. 2 which is a construction view viewed from a direction 66 in FIG. 1, that is, from an outer peripheral side of the steam turbine.

In FIG. 2, in the moving blade which is a twisted moving blade, the contact surface 5 of each shroud formed so as to restrain untwisting of the moving blade is formed between the blade back side shroud portion 1a of a following moving blade and the blade face side shroud portion 2b of a preceding moving blade adjacent to the following bade. The contact surface 5 inclines counterclockwise against the turbine rotor shaft, and the inclination angle is an acute angle. Further, in FIG. 2, since a seeing point may be in parallel to the plane 10 including the contact surface 5, the plane is conveniently denoted by dotted line.

The contact surface 5 between the blade back side shroud portion 1a of the following moving blade and the blade face side shroud portion 2b of the adjacent preceding moving blade is arranged or disposed in a position that the plane 10 including the contact surface 5 intersects with an extension line of the blade camber line 3e of the blade section at the blade tip portion of the following moving blade, which extension line is extended to a blade leading edge direction, and an angle between the plane 10 including the contact surface 5 and the steam upstream side end face 51 of the blade face side shroud portion 1b of the following moving blade is an obtuse angle.

A practical range of the obtuse angle is from 90° to 160°.

Figure 10:
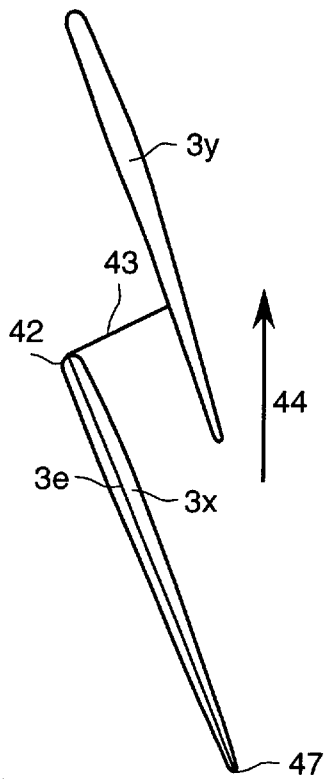
FIG. 10 is a view for explaining an upstream and downstream of steam at the blade tip.

Here, the expressions of "a steam upstream side from a blade leading edge" or "a steam downstream side from a blade leading edge" (in some cases, referred to as "upstream side" or "downstream side") are explained, referring to FIG. 10.

In FIG. 10, an arrow 44 denotes a rotation direction of the moving blades. One, of two moving blades between which one flow passage is formed, which is positioned forward in the rotation direction is called a preceding moving blade, and the blade section at a blade tip portion of the preceding moving blade is denoted by 3y. The other moving blade positioned backward in the rotation direction is called a following moving blade, and the blade section at a tip portion is denoted by 3x. Reference symbols 3e, 42, 47 denote a blade camber line of the following moving blade, a blade leading edge of the following moving blade and a blade trailing edge of the following moving blade, respectively. A perpendicular line 43 is perpendicular to the blade camber line 3e at the blade leading edge. In this figure, in a steam flow passage between the following and preceding moving blades, a left upper side of the perpendicular line 43, which is a forward side of rotation direction of the following moving blade, and which is a side in which the following moving blade does not exist, is called a steam upstream side from the blade leading edge. A right down side, that is, a side in which the following moving blade exists is called a steam downstream side of the blade leading edge.

Figure 7:
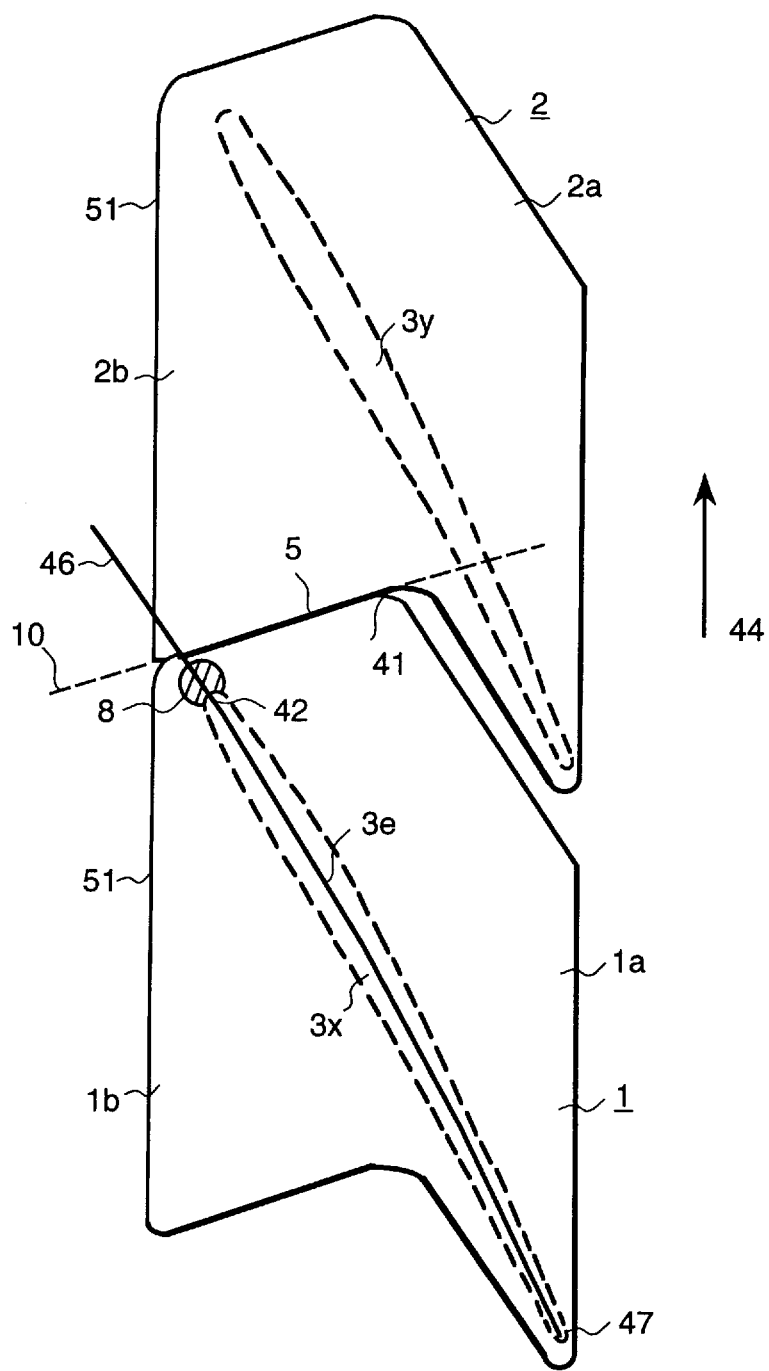
FIG. 7 is a plan view of shrouds of the steam turbine moving blades of another embodiment of the present invention.

An example of the clear construction is shown in FIG. 7.

The plane 10 including the contact surface 5 formed between the blade back side shroud portion 1a of the following moving blade and the blade face side shroud portion 2b of the preceding moving blade is disposed at a position in which the plane 10 does not intersect with the blade section 3x at the blade tip portion of the following moving blade, and is arranged to intersect with an extension line 46 of the blade camber line 3e of the blade section at the blade tip portion of the following moving blade, which extension line is a line that the blade camber line 3e is extended forward from the blade leading edge 42.

In the moving blade of the above-mentioned structure, a surface (viewed from an outer peripheral direction of the moving bade), of the blade back side shroud portion 1a of the following moving blade, including the contact surface 5 and opposing the blade face side shroud portion 2b of the preceding moving blade is shaped in an approximately convex shape to a forward side in the rotation direction of the moving blade, and a surface, of the blade face side shroud portion 2b of the preceding moving blade, including the contact surface 5 and opposing the blade back side shroud portion 1a of the adjacent following moving blade is formed in an approximately concave shape to a backward side in the rotation direction of the moving blade. In a region in which the above-mentioned shroud portions of the following and preceding moving blades are opposite to each other, a part of the region, which is a region more backward (toward the trailing edge side 47) than the contact surface 5 has a gap between the shroud portions of the following and preceding moving blades.

In this figure, the shroud portions 1, 2 having simple concave or convex profiles are shown. However, shroud portions having a plurality of concave convex shapes can be adapted as long as any plane 10 including the contact surface 5 intersects with a forward extension line 46 of the blade camber line 3e.

Further, at a surface portion, of the blade back side shroud portion 1a or 2a, opposite to the blade face side shroud portion 1b or 2b of the adjacent moving blade and positioned in a reverse side of the rotation direction 44 of moving blade with respect to any plane 10 including the contact surface 5, a gap is formed between the shroud portions.

Further, in FIG. 2, a portion 8 of the shroud in the vicinity of the blade leading edge of the blade section 3x at the blade tip portion of the following moving blade (in particular, at a more blade back side than the blade leading edge 42 of the back side shroud portion)has no concave portion such as a notch, viewed from an outer peripheral side of the steam turbine.

Further, as an example of a concrete construction, the following aspect can be taken.

In the shroud portions 1, 2, the opposite surface of the blade back side shroud portion 1a of the following moving blade, opposing the blade face side shroud portion 2b of the adjacent preceding moving blade, is formed in a convex shape to the rotation direction 44 of moving blade. The apex 41 of the convex shape is in a region more to the forward side of the rotation direction 44 than the perpendicular line 43 perpendicular to the blade camber line 3e of the blade section at the blade tip portion at the leading edge 42, and a region contacting with the blade face side shroud portion 2b of the adjacent moving blade is disposed in a side more to the forward of the rotation direction 44 than the blade leading edge 42.

The above-mentioned apex portion 41 is a maximum forward portion of the convex portion in the rotation direction 44 of the moving blade. A region from the apex portion 41 of the convex portion to the blade leading edge 42, which region includes the contact surface, is formed in a more forward side in the moving blade rotation direction than the above-mentioned blade leading edge 42. A gap is formed between the blade back side shroud portion 1a of the moving blade and the blade face side shroud portion 2b of the adjacent moving blade in a region from the apex portion 41 of the convex portion to the blade trailing edge 47.

In FIG. 2, as the steam turbine rotates, centrifugal force applied to the moving blades causes them to untwist in a direction shown by a reference number 9, the shrouds 1, 2 provided on the blade tips of the adjacent moving blades are connected each other at the contact surface 5 so that the blade back side shroud portion 1a of the following moving blade and the blade face side shroud portion 2b of the preceding moving blade each restrain the untwisting of the moving blades. At this time, force applied on the contact surface 5 includes, in addition to force applied perpendicularly on the contact surface, shearing force along the contact surface 5 by centrifugal force, in radial directions of the rotor disc, directed to the outer peripheral side. Further, shearing force along the contact surface also is applied by the phenomenon of rubbing of the contact surfaces 5 between the blade back side shroud portion 1a of the following moving blade and the blade face side shroud portion 2b of the preceding moving blade, which rubbing is caused by blade vibrations. By influence of the shearing force, an end of force flow goes to a portion 8 of the shroud in the vicinity of the blade tip portion fixing the above-mentioned blade back side shroud portion 1a. Therefore, the largest stress concentration in the above-mentioned blade back side shroud portion 1a occurs at the portion 8 in the vicinity of the blade tip portion in FIG. 2.

The moving blades according to the embodiment of the present invention each are formed so that the plane 10 including the contact surface 5 between the blade back side shroud portion 1a of the following moving blade and the blade face side shroud portion 2b of the preceding moving blade adjacent to the following moving blade intersects with an extension line which the blade camber line 3e at the blade is tip portion of the following moving blade is extended toward the blade leading edge 42, and the above-mentioned contact surface 5 is arranged so that an angle between the above-mentioned plane and the steam upstream side end 51 of the blade back side shroud portion of the following moving blade is an obtuse angle.

Therefore, the shape of the shroud portion 8 in the vicinity of the blade tip portion is shaped in a convex curved surface, so that a degree of the stress concentration can be reduced in view of the shape. Further, the place is a position which is separated from around the blade back side portion 19 shown in FIG. 5 in which erosion is most likely to occur. Therefore, in the blade back side shroud portion 1a, an multiplier effect in a case where the erosion acts at the portion to which the largest stress is applied, can be remarkably lessened.

The shrouds 1, 2, to which various explanations are given, have a gap between the blade back side shroud portion 1a of the following moving blade and the blade face side shroud portion 2b of the preceding moving blade in the region from the contact surface 5 to the blade trailing edge side 47. The opposite surface, of the blade back side shroud portion 1a, opposing the blade face side shroud portion 2b of the preceding moving blade can be formed in a plurality of convex shapes, for example, other than the above-mentioned simple convex shape, however, even if such a shape is taken, the above-mentioned gap is necessary to be provided.

As mentioned above, even in the moving blade construction in which a preceding moving blade (another moving blade) and a following moving blade (one moving blade) are overlapped around the blade tip portion 3b, when viewed from the outer peripheral side (viewed from an arrow 66), for example, the contact surface 5 between the blade back side shroud portion 1a of the following moving blade and the blade face side shroud portion 2b of the preceding moving blade adjacent to the following moving blade can be secured in a wide range, so that even if stress occurs by untwisting of the blade due to the centrifugal force, a stable contact condition can be secured. Therefore, it is possible to provide a stable steam turbine which has no problem on strength.

Further, an example of an assembling method of the moving blade employing the present invention is explained, referring to FIG. 3. In FIG. 3, when the blade portion 3 is mounted on the turbine rotor disk portion 4, the blade portion 3 is inserted from the outer peripheral portion of the turbine rotor disk portion 4 as shown in the figure, and then it is fixed by the pins 65. In this assembling method, it is unnecessary to insert the blade portion 3 into the disk portion under the condition that the blade portion is twisted in advance. Because as mentioned above, in the moving blades employing the present invention, upon rotation of the turbine, the blades are untwisted by centrifugal force applied to the moving blades, and the adjacent shrouds of the moving blades contact with each other at the contact surface 5 as shown in FIG. 2, etc. Further, in FIG. 3, as an example of the shape of the blade root portion 63, a fork shape is shown, however, another shape such as saddle shape, Christmas tree shape, etc. can be employed.

Figure 4:
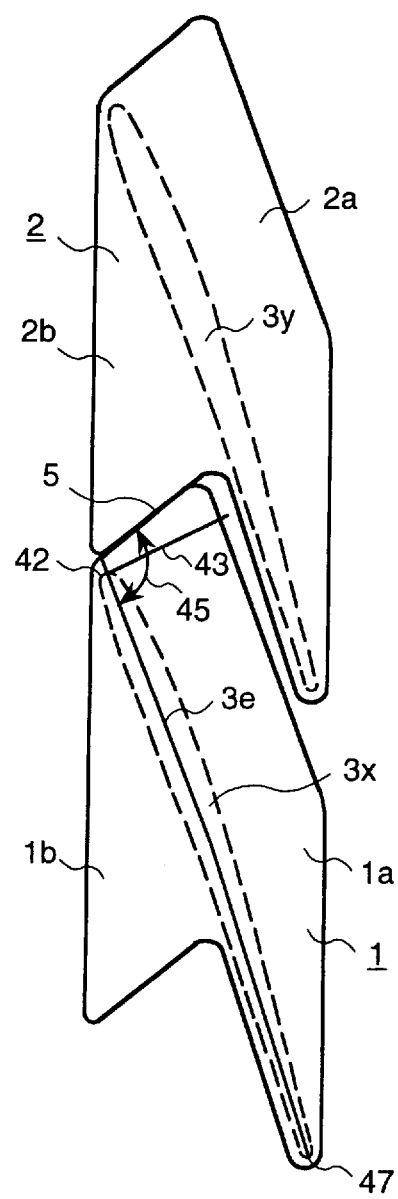
FIG. 4 is a plan view of shrouds of the steam turbine moving blades of another embodiment of the present invention.
Figure 5:
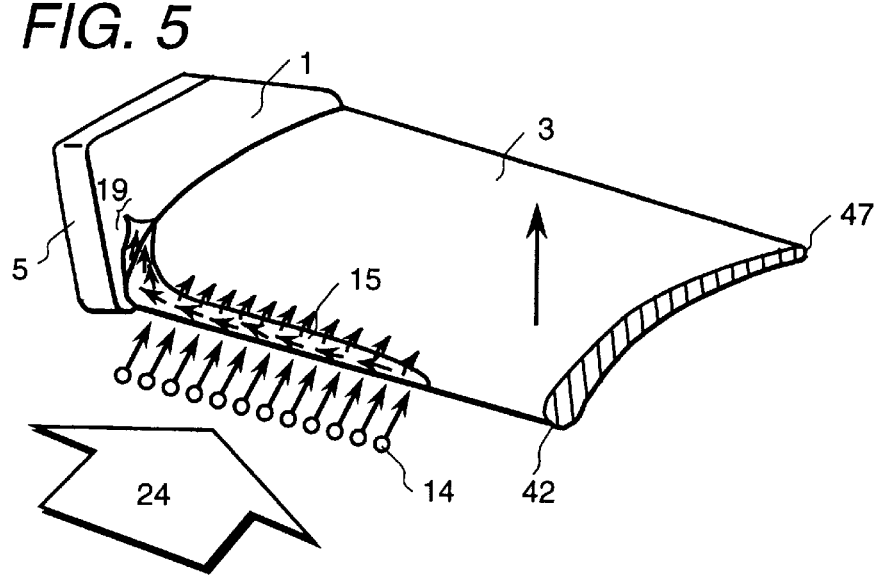
FIG. 5 is a perspective view of a part of the moving blade with a shroud for explanation of water film flow.

Next, another embodiment of the present invention is explained in detail, referring to FIGS. 4 and 5.

FIG. 4 shows a construction of moving blades according to the present invention, viewed from an outer periphery side. FIG. 5 shows behavior of a water film flow on the moving blade.

In FIG. 4, explanation of the same structural parts as in FIG. 2 is omitted. The contact surface 5 is positioned in a region at a left upper side of a perpendicular line 43 perpendicular to the blade camber line 3e at the blade tip portion of the following moving blade. The region corresponds to a steam upstream side of the blade leading edge, previously defined referring to FIG. 10. Further, the blade section 3y of the blade tip portion of the preceding moving blade is positioned in an upstream side of the blade leading edge 42 of the blade section 3x at the blade tip portion of the following moving blade. Further, a blade back side angle 45 between an extension line 46 that the blade camber line 3e of the following moving blade is extended toward the blade leading edge 42 and a plane including the contact surface 5 is an obtuse angle. Although the angle is influenced by an inclination of the blade camber line of the blade section 3x of the blade tip portion against the turbine rotor, the angle is practical in a range of from 90° to 160°.

In this manner, the moving blade of the embodiment of the present invention, when viewed from the outer periphery side, since the contact surface 5 between the blade back side shroud portion 1a of the following moving blade and the blade face side shroud portion 2b of the preceding moving blade adjacent to the following moving blade is arranged so as to be positioned in a more forward side in blade rotation direction 44 than the shortest perpendicular line 43 connecting the blade leading edge 42 at the blade tip portion of the following moving blade and the blade face side of the preceding moving blade, the shape of the shroud in the vicinity of the blade tip portion has no notch portion, and is shaped in a convex curved surface, a degree of stress concentration can be lessened because of the shape. Further, the place is a position which is separated from around the blade back side portion 19 in which erosion is likely to occur. Therefore, in the blade back side shroud portion 1a, an multiplier effect in a case where the erosion acts at the portion to which the largest stress is applied can be remarkably lessened.

Here, considering the behavior of a water drop 14 concerning erosion affecting the back side of the following moving blade, the water drop 14 adhered on the back side of the following moving blade forms a water film flow 15 flowing to a direction of blade tip portion along the blade face by centrifugal force. The water film flow 15 flows from the blade leading edge 42 side to the blade trailing edge 47 side, influenced by steam flow. Therefore, even when the water film flow reaches the inner periphery side of the blade back side shroud 1, the water film flow 15 flows toward the downstream side. Therefore, a portion 19 around the blade back side is a place in which the influence of the water film flow is susceptible.

The contact surface of the moving blade according to the present invention is in the upstream side more than the blade leading edge of the blade section 3x of the blade tip portion of the following moving blade, so that influence of the water film flow is very small. That is, the moving blade according to the present invention can lessen not only stress concentration and erosion, but makes it difficult to cause fretting wear caused by small vibrations of the contact surface due to vibrations of the moving blade and rubbing by accompanying water drops.

Figure 6:
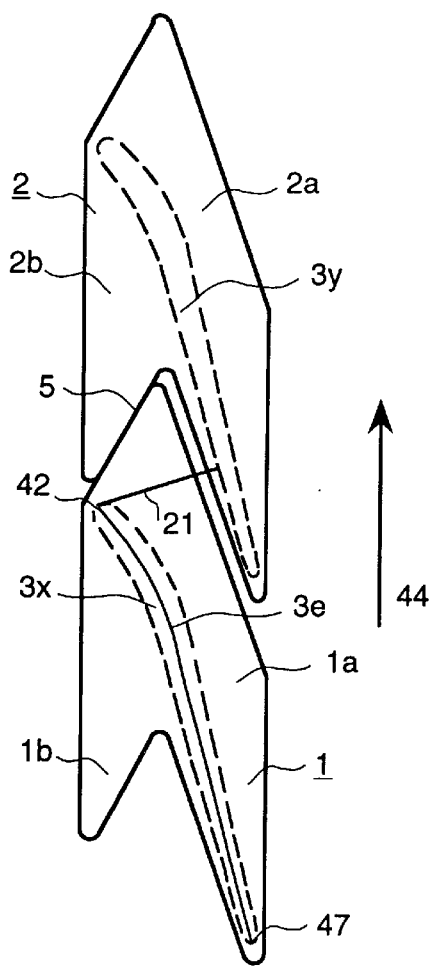
FIG. 6 is a plan view of shrouds of steam turbine moving blades of another embodiment of the present invention.

Next, still another embodiment of the present invention is explained in detail, referring to FIG. 6. FIG. 6 is a construction view of moving blade according to the present invention, viewed from the outer periphery side.

In FIG. 6, explanation of the same structural parts as the moving blade in FIG. 4 is omitted. A straight line 21 is a shortest straight line drawn from the blade leading edge 42 of the blade section of the blade tip portion of the following moving blade to the blade face side of the preceding moving blade. The contact surface 5 is in the left upper side of the straight line 21, that is, it is positioned at a turbine rotation direction forward side.

In a case where a curvature of the blade camber line 3e of the blade section at the blade tip portion is larger, compared with in FIG. 4, the same effect as in FIG. 4 attains even by the moving blade structure shown in FIG. 6. This occurs in the structure of because in FIG. 6, because a rotation direction forward side of the shortest straight line drawn from the blade leading edge 42 of the following moving blade to the face side of the preceding moving blade is in a region in which steam flow is faster than in the vicinity of blade leading edge 42, and a water drop adhered by erosion is difficult to become a water film flow thereby to flow toward the contact surface 5 of the following moving blade existing in the region.

Further, in the moving blades of the present invention shown in FIGS. 2, 4 and 6, the contact surface 5 of the blade back side shroud portion 1a is preferable to be a uniform flat surface without provision of a concave and convex shape until the leading edge portion, viewed from the moving blade outer periphery side, because the concave shape causes stress concentration.

However, in the above-mentioned figures, the surface opposing the blade face side shroud portion 2b of the adjacent preceding moving blade and including the contact surface 5 is a simple convex shape. A plurality of convexities can be formed, however, if the relation as defined in the figures is satisfied. Even if a plurality of convex shape are formed, it is necessary to have a gap in a region in the downstream side (a so-called backward side region in the blade rotation direction 44) of a surface, of the blade back side shroud portion, opposing the blade face side shroud portion 2b of the adjacent preceding moving blade and including the contact surface 5.

Further, the above-mentioned contact surface 5 can be a curved surface. A curved plane including the curved contact surface 5 and having the same curvature as the contact surface is arranged in a position at which the curved plane does not intersect with the blade section 3x of the blade tip portion of the blade portion 3.

The contact surface 5 is arranged to be positioned in a region at the steam upstream side from the blade leading edge 42 of the blade section at the blade tip portion of the following moving blade. Further, it is arranged to be positioned in the forward side in the moving blade rotation direction from a shortest straight line connecting between the blade leading edge of the blade section 3x of the blade and the blade face side of the preceeding moving blade tip portion of the following moving blade.

With such a construction as mentioned above, even if the contact surface 5 is not a plane, the same effect as the embodiment shown in FIGS. 2, 4 and 6 can be attained. Further, the curved contact surface 5 is likely to be nearly a point contact as compared with the plane, a contact degree between the adjacent shrouds becomes more loose, so that there is an additional effect that vibration attenuation in the moving blade structure is raised.

Erosion and fretting wear which are to be solved by the present invention are explained hereunder.

Figure 9:
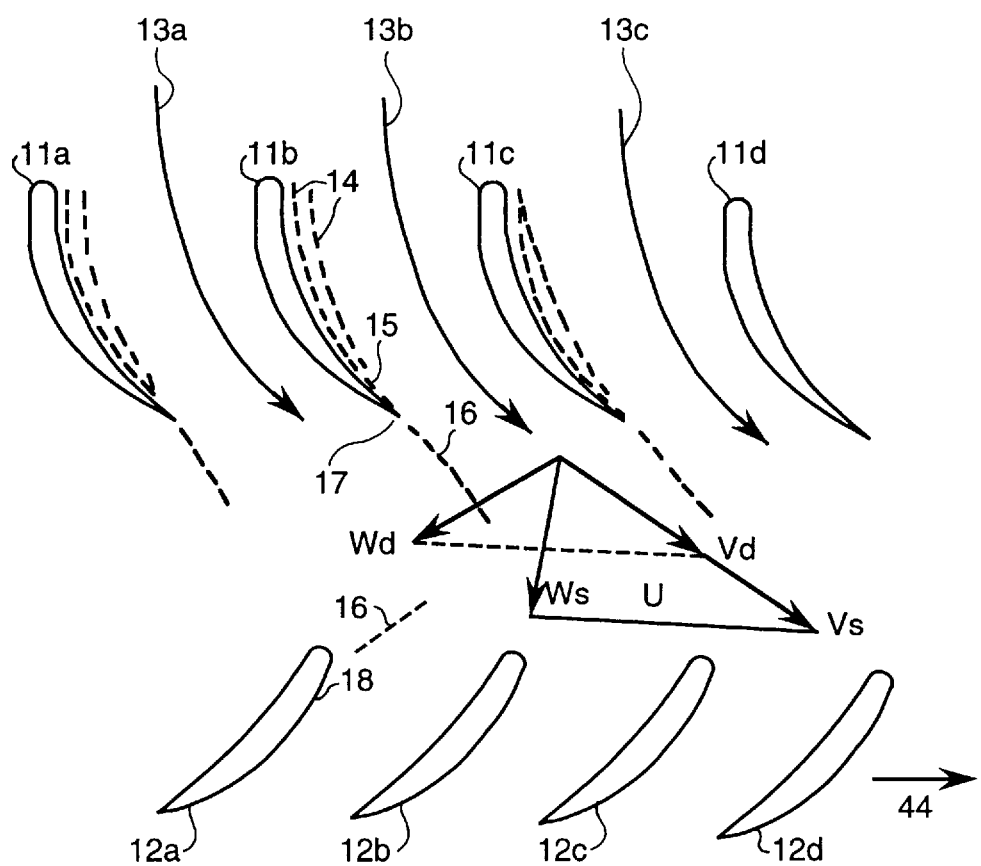
FIG. 9 is an explanation view for erosion occurrence in a turbine stage.

First, an erosion phenomenon is explained, referring to FIG. 9. In this figure, 11a–11d denote a stationary blade (a nozzle), 12a–12d a moving blade, 13a–13c a steam flow, 14 a water drop, 15 a water film flow, 16 sputtered water droplets, 17 a stationary blade trailing edge, and 18 a moving blade back side portion. In the steam turbine stage thus constructed, fine water droplets flow in the same traces as the steam flows 13a–13c in wet steam flows flowing in a cascade of the stationary blades 11a–11d. For example, at the stationary blade 11a, a relatively large water drop 14 separates from the steam flow because of its momentum effect, impinges on and adheres to the surfaces of the stationary blades 11a–11d, whereby a water film flow 15 is formed thereon. When the water film flow reaches the stationary blade trailing edge 17, it is accelerated by the steam flows 13a–13c, whereby it separates from the stationary blade trailing edge to be turned into sputtered water droplets. The flow velocity of the sputtered water droplets 16 is a flow velocity Vd which is remarkably slow as compared with the flow velocity Vs of the steam flow, because the sputtered water droplet becomes larger in its diameter and increases its mass more than in an initial water drop. Since the moving blades rotate at a velocity U, the steam flow is expressed by a relative velocity Ws on a velocity triangle, while the sputtered water droplets becomes a relative velocity Wd. Therefore, almost all the water droplets enter the moving blades 12a–12d with a condition of little (almost no) elevation angle, while the sputtered water droplets impinge on the moving blade back side at a large elevation angle, so that erosion by water droplets at the moving blade back side portion 18 can not be avoided. Various measurements have been taken of the erosion, however, and the erosion has not been avoided completely. That is, it is one of the problems which can not be avoided in the steam turbine.

For example, as shown in FIG. 2, etc., the blade back side shroud portion 1a and the blade face side shroud portion 2b receive opposite forces at the contact surface 5 so as to restrain untwisting applied to the moving blades during rotation of the turbine. At this time, maximum bending stress in the shroud affected by the force restraining the untwisting applied to the contact surface 5 occurs at a concave notch portion at the blade back side (in particular, at the blade back side shroud portion at a downstream side from the blade leading edge 42 of the blade section 3x of the blade tip portion) which is extended from the contact surface 5 in a direction of the blade section 3x of the blade tip portion as shown by the dotted line, because a blade surface which is a joining portion with the shroud becomes a fixed end. Therefore, this place should be designed with great care as a place where strength is given close attention.

The shroud portion of the moving blade of the embodiment of the present invention has no concave notch portion which is formed at a position of a blade back side shroud portion of a conventional shroud as disclosed in FIG. 3 of JP A 4-5402, which position is around an intersection of the blade section and an extension line of the contact surface. Therefore, as shown in FIG. 5, affection of the water film flow 15 can be suppressed. Further, the above-mentioned concave notch portion of the conventional shroud is positioned in the vicinity of the previously mentioned moving blade back side portion 18 in FIG. 9, so that there is a possibility that sputtered water droplets impinge directly thereon. However, in the present invention there is no such a possibility.

Further, in the moving blade of the embodiment of the present invention, it is possible to suppress brittleness with respect to strength by erosion of a portion around the blade back side portion 19 of the shroud joining portion in the vicinity of the blade section 3x of the blade tip portion as shown in the prior art. In the blade back side shroud portion 1a, since even if large bending stress is applied around the shroud-blade boundary supporting the shroud 1, affection of erosion can be avoided, so that a stable condition of the moving blade with respect to strength can be attained.

Further, in the prior art, the sputtered water droplets as explained in FIG. 9 stay in a gap because gas exists which is formed between an end face extending from the above-mentioned concave notch portion to the left upper side and the shroud portion. At this time, if the contact surface 5 of the shroud is disposed in a downstream side of the blade leading edge, water in the gap becomes to be a water film flow and flows down to a downstream side, whereby a possibility becomes higher that the contact surface connecting the adjacent shrouds is made wet. Under such a condition, when the moving blades vibrate, small vibrations occur at the contact surface connecting the shrouds, so that in the contact surface of the shrouds, the danger of fretting wear including water increases.

To the contrary, in the moving blades of the embodiment of the present invention, the above-mentioned danger of fretting wear can be suppressed as explained in detail in the embodiment of FIG. 4 by employing the construction of the shrouds 1, 2 as mentioned above.

Figure 8:
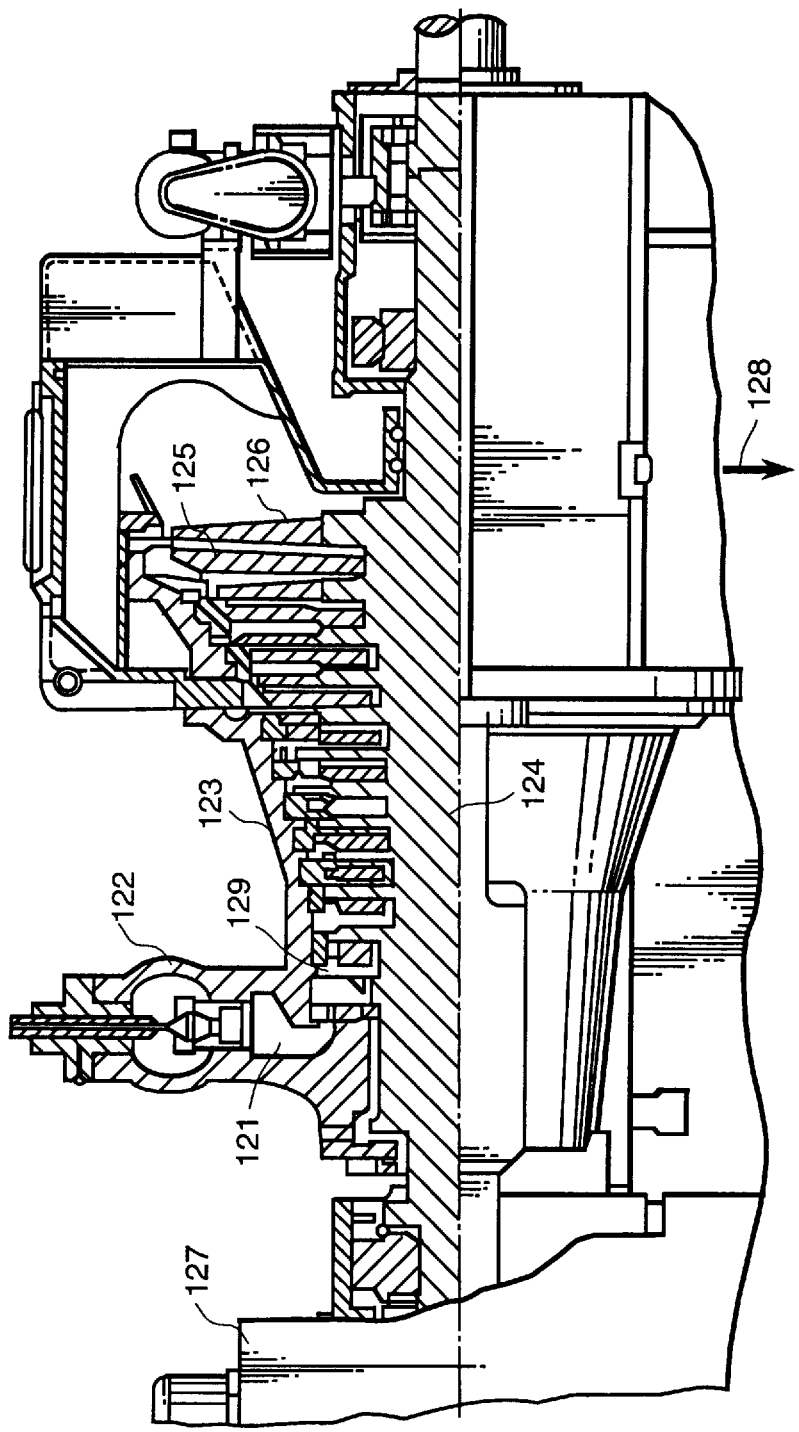
FIG. 8 is a sectional view of a steam turbine of an embodiment of the present invention.

Next, sill further another embodiment of the present invention is explained, referring to FIG. 8.

A steam turbine comprises a steam supply portion 121, a turbine chamber 129 supplied with steam from the steam supply portion 121, a rotor shaft 124 in the turbine chamber 129, a plurality of stages, each of which has moving blades 126 and stationary blades 125 (nozzles), and an exhaust portion 128 for exhausting steam from the turbine chamber 129.

The rotor shaft 124 is connected to an electric generator 127. High pressure steam is supplied from the steam supply portion 121 through a steam control valve 122, flows in the turbine chamber 129 and then is exhausted into the exhaust portion 128 through the moving blades in the most downstream side in the low pressure side. The exhaust portion is connected to a condenser, for example. A casing 123 covers the peripheral portion of the turbine chamber. In FIG. 8, a single flow steam turbine is shown, but a double flow type can be adapted.

The moving blades of the steam turbine employ any one of the above mentioned structures in at least any one of the stages. Thereby, a steam turbine can be provided which is excellent in reliability as a whole.

For example, the above-mentioned moving blades can be arranged in the final stage.

Thereby, stress concentration, erosion and/or fretting wear in the moving blades of the final stage in which steam is highly wet and untwisting of the moving blades due to centrifugal force is large, can be suppressed.

Further, the above-mentioned moving blades can be arranged in a more upstream side stage than the final stage.

For example, in a stage which is susceptible to the effect of stress concentration and erosion or the effect of fretting wear by steam atmosphere and untwisting by centrifugal force, a shroud shape of the moving blades as shown in FIGS. 2, 4 or 6, in which such an effect is unlikely to be susceptible can be selected, so that a steam turbine having moving blades of stable strength can be provided.

Further, the moving blades having the shrouds shown in FIGS. 2, 4 or 6 can be arranged in any stage in which the blade portion length is in a range of 20–30 inches.

Thereby, as moving blades in a stage which has the blade portion length which is considered to be susceptible to the effect of stress concentration and erosion or the effect of fretting wear by steam atmosphere and untwisting by centrifugal force, a shroud shape of the moving blades as shown in FIGS. 2, 4 or 6, in which such the effect is unlikely to be susceptible can be selected and arranged, so that a steam turbine having moving blades of stable strength can be provided.

For example, in a steam turbine of 300 to 400 MW having moving blades of 20.9 inches of the second stage from the lower pressure side, the moving blades of the above-mentioned embodiments can be used in order to suppress the stress concentration and erosion, or fretting wear, considering steam conditions and untwisting degree by centrifugal force.

Figure 11:
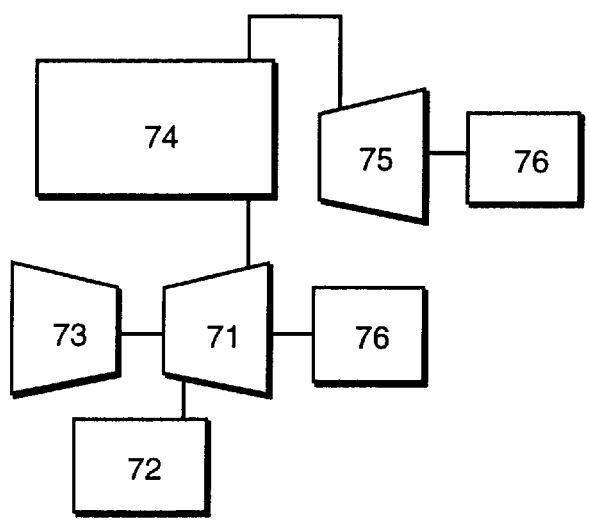
FIG. 11 is a diagrammatic view of a combined cycle plant.

Next, further another embodiment of the present invention is explained, referring to FIG. 11. FIG. 11 shows a combined cycle plant comprising a gas turbine 71, a combustor 72, a compressor 73, an exhaust gas recovery boiler 74, a steam turbine 75 and an electric generator 76.

In the combined cycle plant, the steam turbine 75 having a plurality of stages each comprising moving blades 126 and stationary blades 125 as shown in FIG. 8, and each of the moving blades is formed so that the sectional profile of the blade portion 3 is twisted from a blade root thereof to a blade tip thereof, and provided with a shroud formed integrally with and at the blade tip of the moving blade, as shown in FIGS. 1 and 3, wherein, as shown in FIG. 2, a plane 10 including a contact surface 5 between a blade back side shroud portion 1a of a following moving blade and a blade face side shroud portion 2b of a preceding moving blade adjacent to the following moving blade intersects with a forward extension line 46 of a camber line 3e at the blade tip 42 of the following moving blade, and the contact surface 5 is arranged so that an angle between the plane 10 and a steam upstream side end 51 of the blade back side shroud portion is an obtuse angle.

Thereby, the life of a combined cycle plant can be extended and a stable combined cycle plant of high reliability can be provided.

When the plant is provided with electric power generation equipment, stable supply of electric power can be maintained.

What is claimed is:

1. A steam turbine having a plurality of moving blades arranged in a circumferential direction of a turbine rotor shaft and driven by steam, each of said moving blades being a twisted blade formed so that the sectional profile of said moving blade is twisted from a blade root thereof to a blade tip thereof, said moving blades being provided with shrouds formed integrally with and at the blade tips of said moving blades, respectively, wherein a plane including a contact surface between a blade back side shroud portion of one of said moving blades and a blade face side shroud portion of another moving blade adjacent to said one moving blade intersects with a forward extension line of a camber line in a blade section at the blade tip of said one moving blade, and said contact surface is arranged so that an angle between said plane and an upstream side end of said blade face side shroud portion of said one moving blade is an obtuse angle.

2. A steam turbine according to claim 1, wherein when viewed from an outer peripheral direction of said moving blade, a surface of the blade back side shroud portion of said one moving blade, which surface includes said contact surface and is opposite to the blade face side shroud portion of said another moving blade, is shaped in an approximately convex shape oriented to a forward side with respect to the moving blade rotation direction, a surface of the blade face side shroud portion of said another moving blade, which surface includes said contact surface and is opposite to the blade back side shroud portion of said one moving blade, is shaped in an approximately concave shape oriented to a backward side with respect to the moving blade rotational direction, and said shrouds of said moving blades opposite to each other have a gap formed, at a more trailing edge side than said contact surface, between said blade back side shroud portion of said one moving blade and said blade face side shroud portion of said another moving blade.

3. A steam turbine according to claim 1, wherein said moving blades are arranged in a final stage of said turbine.

4. A steam turbine according to claim 1, wherein said moving blades are arranged in a stage at a portion upstream from a final stage.

5. A steam turbine according to claim 1, wherein said moving blades are arranged in any stage of said turbine in which the blade length is in a range of 20 to 30 inches.

6. A steam turbine having a plurality of moving blades arranged in a circumferential direction of a turbine rotor shaft and driven by steam, each of said moving blades being a twisted blade formed so that the sectional profile of said moving blade is twisted from a blade root thereof to a blade tip thereof, said moving blades being provided with shrouds formed integrally with and at the blade tips of said moving blades, respectively, wherein a contact surface between a blade back side shroud portion of one side of said moving blades and a blade face side shroud portion of another preceding moving blade adjacent to said one moving blade is positioned in a region at a more upstream side of steam flow than a leading edge at said blade tip of said one moving blade.

7. A steam turbine having a plurality of moving blades arranged in a circumferential direction of a turbine rotor shaft and driven by steam, each of said moving blades being a twisted blade formed so that the sectional profile of said moving blade is twisted from a blade root thereof to a blade tip thereof, said moving blades being provided with shrouds formed integrally with and at the blade tips of said moving blades, respectively, wherein when viewed from an outer peripheral side of said moving blade, a contact surface between a blade back side shroud portion of one of said moving blades and a blade face side shroud portion of another preceding moving blade adjacent to said one moving blade is positioned at a more forward side in a rotational direction of said one moving blade than a shortest straight line connecting a leading edge at the blade tip of said one moving blade and the blade face side of said another moving blade.

8. A combined cycle having a gas turbine, an exhaust gas heat recovery boiler for generating steam with a heat source of exhaust gas heat from said gas turbine, a steam turbine driven by steam generated in said exhaust gas heat recovery boiler, said steam turbine provided with a plurality of stages each of which comprises a plurality of moving blades and stationary blades, said moving blades each being formed so that the sectional profile of said moving blade is twisted from a blade root thereof to a blade tip thereof, and being provided with a shroud formed integrally with and at the blade tip of said moving blade, wherein a plane including a contact surface between a blade back side shroud portion of one of said moving blades and a blade face side shroud portion of another moving blade adjacent to said one moving blade intersects with a forward extension line of a camber line in a blade section at the blade tip of said one moving blade, and said contact surface is arranged so that an angle between said plane and an upstream side end of said blade face side shroud portion of said one moving blade is an obtuse angle.

\* \* \* \* \*